(12) United States Patent
Engstrand

(10) Patent No.: US 7,476,842 B2
(45) Date of Patent: Jan. 13, 2009

(54) SYSTEM AND METHOD FOR EMITTING AND/OR DETECTING LIGHT WITHIN A COMPARTMENT

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 0 days.

(21) Appl. No.: 11/394,712

(22) Filed: Mar. 31, 2006

(65) Prior Publication Data
US 2007/0075226 A1   Apr. 5, 2007

Related U.S. Application Data

(63) Continuation-in-part of application No. 11/242,799, filed on Oct. 3, 2005.

(51) Int. Cl.
*G01D 5/34* (2006.01)
*F01B 25/26* (2006.01)

(52) U.S. Cl. .............................. 250/231.1; 91/1; 92/5 R

(58) Field of Classification Search ............. 250/201.1, 250/231.1; 91/1; 92/5 R
See application file for complete search history.

(56) References Cited

U.S. PATENT DOCUMENTS

| | | |
|---|---|---|
| 3,368,751 A | 2/1968 | Merrill |
| 3,885,875 A | 5/1975 | Howa, Jr. et al. |
| 4,150,299 A | 4/1979 | Kasiewicz et al. |
| 4,501,642 A | 2/1985 | Wells |
| 4,661,695 A | 4/1987 | Mori et al. |
| 4,736,674 A | 4/1988 | Stoll |
| 4,806,707 A | 2/1989 | Landmeier |
| 4,902,903 A | 2/1990 | Segerson et al. |
| 4,970,361 A | 11/1990 | Fuse |
| 5,182,979 A | 2/1993 | Morgan |
| 5,231,959 A | 8/1993 | Smietana |
| 5,271,505 A | 12/1993 | Low |
| 5,705,742 A | 1/1998 | Fox et al. |
| 5,744,705 A | 4/1998 | Derouen et al. |
| 6,952,009 B1 | 7/1998 | Brunet et al. |
| 5,799,629 A | 9/1998 | Lowi, Jr. |
| 5,977,778 A | 11/1999 | Chan et al. |

(Continued)

*Primary Examiner*—Thanh X Luu
(74) *Attorney, Agent, or Firm*—Patents & TMS, P.C.

(57) ABSTRACT

A system and a method emit and/or detect light within a compartment via one or more lenses. A light source emits the light in an interior of the compartment via one or more lenses and/or an optical fiber. Further, the system and the method may provide a light sensor for measuring and/or for detecting an intensity of the light within the interior of the compartment via one or more lenses. A movable element is located within the interior of the compartment which moves inwardly and/or outwardly with respect to the light source, the light sensor and/or one or more lenses. A surface of the movable element, a shaft attachable to the movable element and/or the compartment absorbs an amount of the emitted light. The amount of the emitted light absorbed by the surface of the movable element, the shaft of the movable element and/or the compartment is based on the position of the movable element within the interior of the compartment. The light sensor detects and/or measures the intensity of the emitted light which is not absorbed by the surface of the movable element, the shaft of the movable element and/or the compartment. The intensity of the emitted light which is detected by the light sensor corresponds to a position of the movable element. The light sensor determines the position of the movable element based on the intensity of the emitted light.

20 Claims, 6 Drawing Sheets

U.S. PATENT DOCUMENTS

| | | |
|---|---|---|
| 5,988,676 A | 11/1999 | Lotito et al. |
| 6,058,776 A | 5/2000 | Algers et al. |
| 6,115,168 A * | 9/2000 | Zhao et al. .................. 359/247 |
| 6,611,318 B2 * | 8/2003 | LaPolice .................... 356/3.03 |
| 2002/0083826 A1 * | 7/2002 | Arshad et al. ................. 92/5 R |
| 2002/0168153 A1 * | 11/2002 | Yamabayashi et al. ........ 385/88 |

* cited by examiner

SYSTEM AND METHOD FOR EMITTING AND/OR DETECTING LIGHT WITHIN A COMPARTMENT

This application is a Continuation-In-Part Application of co-pending U.S. patent application Ser. No. 11/242,799 filed on Oct. 3, 2005.

BACKGROUND OF THE INVENTION

The present invention generally relates to a system and a method for emitting and/or detecting light within a compartment. More specifically, the present invention relates to a system and a method for emitting and/or detecting light within a compartment via one or more spherical ball lenses. The system and the method may provide a light source for emitting light in an interior of the container via a first spherical ball lens and/or an optical fiber. Further, the system and the method may provide a light sensor for measuring and/or for detecting an intensity of the light within the interior of the compartment via a second spherical ball lens. A movable element may be located within the interior of the compartment which may be moved and/or may be driven inwardly and/or outwardly with respect to the light source and/or the light sensor. The intensity of the emitted light which may be detected by the light sensor may correspond to a position of the movable element within the interior of the compartment. A surface of the movable element, a shaft attachable to the movable element and/or the compartment may absorb an amount of the emitted light based on the position of the movable element within the interior of the compartment.

A microprocessor and/or a driver may be connected to and/or may in communication with the light source and/or with the light sensor. The microprocessor may determine and/or may calculate the position of the movable element within the compartment based on the intensity of the emitted light which may be detected and/or may be measured by the light sensor. The intensity of the emitted light may not include the amount of the emitted light which may be absorbed by the surface of the movable element, the shaft and/or the compartment. Further, the intensity of the emitted light detected by the light sensor may be based on the intensity of the emitted light which may not be absorbed by the surface of the compartment, the movable element and/or the shaft of the movable element.

It is, of course, generally known to move and/or to drive a movable element within an interior of a compartment for moving and/or for driving a machine which is connected to the movable element. The position of the movable element in the interior of the compartment may correspond to a location of the machine element. Typically, a first sensor in the compartment or adjacent to the movable element must contact the movable element to detect, to determine and/or to measure the position of the movable element with respect to the compartment. The position of the movable element within the interior of the compartment may correspond to a position of the machine element with respect to the compartment. A second sensor may be required to be attached to, to be connected to and/or to contact the movable element, the machine element and/or the compartment to increase an accuracy of the first sensor for detecting and/or for measuring the position of the movable element and/or the machine part.

However, contact between the movable element and the first sensor may cause the first sensor to inaccurately detect and/or to inaccurately measure the position of the movable element in the compartment. Further, contact between the movable element and the first sensor may damage and/or may destroy the movable element and/or the first sensor. As a result, the first sensor may be inoperable or may inaccurately detect and/or may inaccurately measure the position of the movable element in the compartment. Moreover, contact between the second sensor and the movable element and/or the machine element may damage and/or may destroy the second sensor, the movable element and/or the machine element. As a result, the second sensor may be inoperable or may be incapable of increasing the accuracy of the first sensor.

A tube or a chamber may be attached to the compartment for connecting a third sensor to the compartment. The third sensor may be used to detect a position of the movable element within the compartment based on an amount of light detected within the compartment. However, the light may be diffracted within the cylinder prior to being detected by the third sensor. Additionally, the cylinder may cause an interference to the light being detected by the third sensor in the tube. As a result, the third sensor in the tube may inaccurately detect and/or inaccurately determine the position of the movable head in the interior of the compartment based on the diffraction of and/or the interference with the light within the chamber.

A fluid and/or a gas may be stored and/or may be contained within the interior of the compartment, the tube and/or the chamber for moving the movable element within the interior of the compartment. The fluid and/or the gas may be stored in the compartment at a pressure which may damage and/or may destroy the first sensor, the second sensor and/or the third sensor. As a result, the pressure may cause the first sensor, the second sensor and/or the third sensor to be inoperative for determining the position of the movable element within the interior of the compartment.

A need, therefore, exists for a system and a method for emitting and/or detecting light within a compartment. Additionally, a need exists for a system and a method for emitting and/or detecting light within a compartment which may provide a light source and/or a light sensor for detecting an intensity of emitted light within an interior of the compartment. Further, a need exists for an apparatus, a system and a method for emitting and/or detecting light within a compartment which may provide one or more spherical ball lenses to seal and/or to enclose an interior of an compartment. Still further, a need exists for a system and a method for emitting and/or detecting light within a compartment which may provide a texture, a surface, a finish and/or a coating for absorbing an amount of emitted light within an interior of a compartment. Moreover, a need exists for a system and a method for emitting and/or detecting light within a compartment which may measure and/or may detect collimated light and/or non-collimated light within an interior of the container.

SUMMARY OF THE INVENTION

The present invention provides a system and a method for emitting and/or detecting light within a compartment. Moreover, the present invention provides a system and a method for emitting and/or detecting light within a compartment which may measure and/or may detect an intensity of emitted light within an interior of the compartment. The system and the method may provide one or more spherical ball lenses for transmitting, for projecting and/or for emitting light within the interior of the compartment for determining and/or for measuring a position of a movable element. The system and the method may provide a cavity within the interior of the compartment for receiving and/or for attaching one or more spherical ball lenses to the interior of the compartment. The spherical ball lenses may be located and/or may be positioned between the light source and/or the light sensor and the interior of the compartment. A surface may be formed on the interior of the compartment, on the movable element and/or on a shaft of the movable element To this end, in an embodiment of the present invention, a system for detecting light is provided. The system has a compartment having a body defining an interior wherein the body has an interior surface and a length defined between a first end and a second end of the compartment. Additionally, the system has a wall at the first end of the compartment wherein the wall abuts the body of the compartment and a first lens attached to the wall wherein the first lens is located within the interior of the compartment wherein the lens is spherically shaped. Further, the system has a light source connected to the wall of the compartment wherein the light source emits light into the interior of the compartment wherein the interior surface of the compartment absorbs an amount of the light emitted from the light source. Moreover, the system has a sensor connected to the wall of the compartment wherein the sensor detects an intensity of emitted light within the interior of the compartment via the first lens wherein the intensity of emitted light corresponds to the amount of the light which is absorbed by the interior surface of the compartment and further wherein the first lens is located between the sensor and the interior of the compartment.

In an embodiment, the system has a movable element within the interior of the compartment wherein a position of the movable element within the interior of the compartment corresponds to the intensity of emitted light detected by the sensor.

In an embodiment, the system has a second lens attached to the wall of the compartment wherein the light source emits the light into the interior of the compartment via the second lens.

In an embodiment, the light source is an optical fiber.

In an embodiment, the system has a cavity formed in the wall of the compartment wherein the first lens is located between the cavity and the interior of the compartment.

In an embodiment, the system has a passage formed in the wall of the compartment wherein the passage is located between the light source and the sensor.

In an embodiment, the system has a light absorbing coating on the interior surface of the compartment wherein the light absorbing coating absorbs the amount of the light emitted from the light source.

In another embodiment of the present invention, a method for detecting light is provided. The method has the step of providing a compartment having a body defining an interior wherein the body has an interior surface and a length defined between a first end and a second end wherein the compartment has a wall at the first end wherein the wall abuts the body of the compartment. Further, the method has the step of connecting a first lens to the wall of the compartment wherein the first lens is located within the interior of the compartment wherein the first lens is spherically shaped. Still further, the method has the step of connecting a second lens to the wall of the compartment wherein the second lens is located within the interior of the compartment. Moreover, the method has the step of emitting a light into the interior of compartment via the first lens or the second lens.

In an embodiment, the method has the step of positioning a movable element within the interior of the compartment wherein the movable element is located at a first position with respect to the first wall.

In an embodiment, the method has the step of detecting an intensity of emitted light within the interior of the compartment via the first lens or the second lens.

In an embodiment, the method has the step of absorbing an amount of the light emitted into the interior of the compartment via the interior surface of the compartment.

In an embodiment, the second lens is a sphere.

In another embodiment of the present invention, a method for detecting light is provided. The method has the step of providing a compartment having a body defining an interior wherein the body has an interior surface and a length defined between a first end and a second end wherein the compartment has a wall at the first end wherein the wall abuts the body of the compartment. Additionally, the method has the step of positioning a movable element within the interior of the compartment wherein the movable element is located at a first position within the interior with respect to the wall. Further, the method has the step of connecting a first lens to the wall of the compartment wherein the first lens is located within the interior of the compartment wherein the first lens is spherically shaped. Still further, the method has the step of emitting a light into the interior of the compartment wherein the interior surface of the compartment absorbs an amount of the light emitted into the interior of the compartment wherein the amount of the light corresponds to the first position of the movable element. Moreover, the method has the step of detecting an intensity of emitted light within the interior of the compartment via the first lens wherein the intensity of emitted light corresponds to the amount of light absorbed by the interior surface of the compartment.

In an embodiment, the method has the step of determining the first position of the movable element based on the intensity of emitted light within the interior.

In an embodiment, the method has the step of moving the movable element from the first position to a second position with respect to the wall of the compartment.

In an embodiment, the method has the step of attaching a second lens to the wall of the compartment wherein the light is emitted into the interior of the compartment via the second lens.

In an embodiment, the method has the step of connecting an optical fiber to the wall of the compartment wherein the light is emitted into the interior of the compartment via the optical fiber.

In an embodiment, the method has the step of forming a texture on the interior surface of the compartment wherein the texture absorbs the light emitted within the interior of the compartment.

In an embodiment, the method has the step of forming a texture on the movable element wherein the texture absorbs an amount of the light emitted within the interior of the compartment.

In an embodiment, the method has the step of forming a cavity in the wall of the compartment wherein the first lens is located between the cavity and the interior of the compartment.

It is, therefore, an advantage of the present invention to provide a system and a method for emitting and/or detecting light within a compartment.

Another advantage of the present invention is to provide a system and a method for emitting and/or detecting light within a compartment which may detect and/or may measure an intensity of an emitted light within the interior of the compartment via one or more lenses.

And, another advantage of the present invention is to provide a system and a method for emitting and/or detecting light within a compartment which may provide one or more lenses for emitting and/or for detecting the emitted light within the interior of the compartment.

Yet another advantage of the present invention is to provide a system and a method for emitting and/or detecting light within a compartment which may provide one or more lenses for connecting a light source and/or a light sensor to the interior of the compartment.

A further advantage of the present invention is to provide a system and a method for emitting and/or detecting light within a compartment which may provide an optical fiber for emitting the light into the interior of the compartment.

Moreover, an advantage of the present invention is to provide a system and a method for emitting and/or detecting light within a compartment which may provide a passage within the compartment for positioning, for inserting, for repairing and/or for removing a light source and/or a light sensor.

And, another advantage of the present invention is to provide a system and a method for emitting and/or detecting light within a compartment which may provide a retainer and/or a seal for attaching, for connecting and/or for sealing one or more lenses to the interior of the compartment and/or to a cavity of the compartment.

Yet another advantage of the present invention is to provide a system and a method for emitting and/or detecting light within a compartment which may detect and/or may measure an intensity of ambient light, non-collimated light and/or collimated light within the interior of the compartment.

Another advantage of the present invention is to provide a system and a method for emitting and/or detecting light within a compartment which may provide one or more lenses to prevent damage of a light source and/or a light sensor from a fluid, a toxin, a gas and/or a pressure associated with the interior of the compartment.

Yet another advantage of the present invention is to provide a system and a method for emitting and/or detecting light within a compartment which may provide one or more lenses for receiving and/or for transmitting an intensity of emitted light from the interior of the compartment to a light sensor exterior to the interior of the compartment.

A still further advantage of the present invention is to provide a system and a method for emitting and/or detecting light within a compartment which may illuminate a pressure vessel and/or the compartment with a non-collimated light.

Moreover, an advantage of the present invention is to provide a system and a method for emitting and/or detecting light within a compartment which provides a texture, a finish, a surface and/or a coating for measuring and/or for detecting a position of a movable element within the interior of the compartment.

And, another advantage of the present invention is to provide a system and a method for emitting and/or detecting light within a compartment which may provide a driver for maintaining an intensity of light being emitted from a light source into the interior of the compartment via one or more lenses.

Yet another advantage of the present invention is to provide a system and a method for emitting and/or detecting light within a compartment which may be pressurized beyond five thousand pounds per square inch.

Another advantage of the present invention is to provide a system and a method for emitting and/or detecting light within a compartment which may provide a first coating and/or a second coating for detecting and/or for measuring a position of a movable element within the interior of the compartment.

Yet another advantage of the present invention is to provide a system and a method for emitting and/or detecting light within a compartment which may provide a symmetrical cross-sectional shape of the interior of the compartment.

A still further advantage of the present invention is to provide a system and a method for emitting and/or detecting light within a compartment which may provide a texture, a finish and/or a coating for measuring and/or for detecting a position of a movable element within the interior of the compartment.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a system and a method for emitting and detecting light within a compartment. More specifically, the present invention relates to a system and method for emitting and detecting light within an interior of the compartment via one or more lenses. One or more lenses may connect and/or may attach a light source and/or a light sensor to the interior of the compartment. A surface may be formed on the movable element, a shaft connectable to the movable element and/or the compartment for absorbing an amount of the emitted light within the interior of the compartment. The light sensor may measure and/or may detect an intensity of an emitted light which may not be absorbed by the surface of the movable element, the shaft of the movable element and/or the compartment. A position of a movable element within the interior of the compartment may correspond to the intensity of the emitted light which may be detected by the light sensor. A gas or a fluid may be stored and/or may be located within the interior of the compartment for moving and/or for driving the movable element within interior of the compartment.

Figure 1:
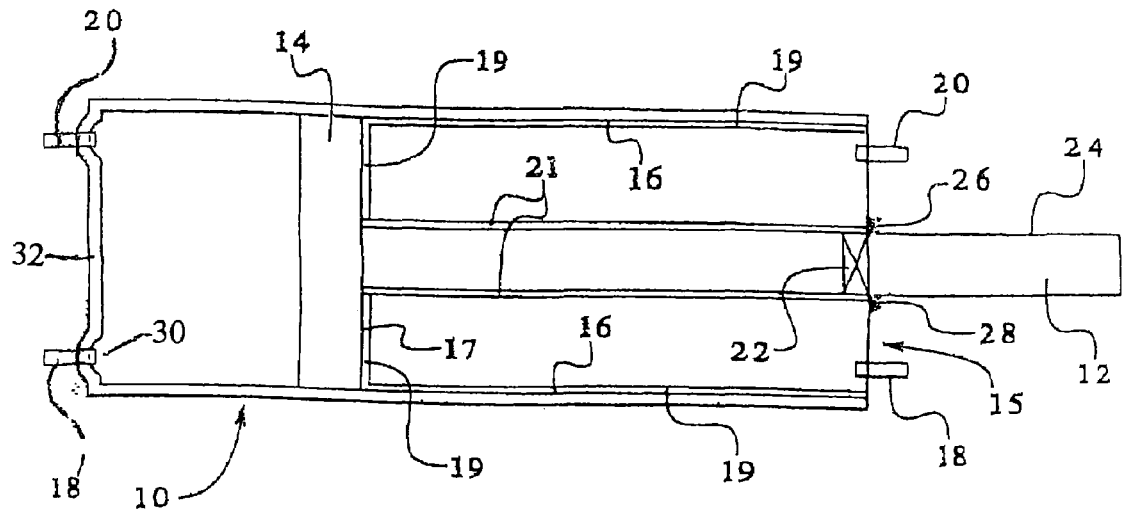
FIG. 1 illustrates a cross-sectional view of a cylinder showing sensor placement and cleaning elements of an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior wall 16. The interior wall 16 may be coated with a substance 19 that may absorb a portion of the light emitted from the light source 18. The light absorbing coating 19 may be an anodizing compound. The surface 17 of the head 14 may also be coated with the light absorbing substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing and contaminant preventative properties. The coatings 19, 21 may have various colors that may affect and/or control the amount of light absorption.

As the head 14 and the shaft 12 transpose through the cylinder 10, a portion of the light emitted from the light source 18 may be absorbed by the coating 19 on the interior wall 16. A portion of the light emitted by the light source 18 may also be absorbed by the coating 19, 21 on the head surface 17. Lastly, a portion of the light emitted by the light source 18 may be absorbed by the coating 21 on the shaft surface 24. The light sensor 20 measures the intensity of light within the interior of the cylinder 10 that is not absorbed by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
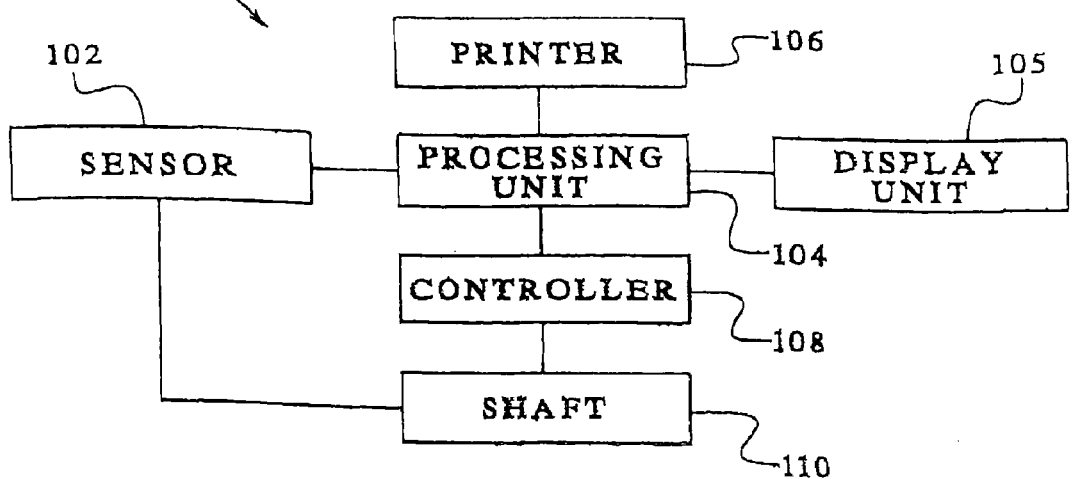
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by the coatings 19, 21 within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12. The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption and also capable of preventing and/or reducing the accumulation of contaminants onto a surface 24 of the shaft 12.

Figure 3:
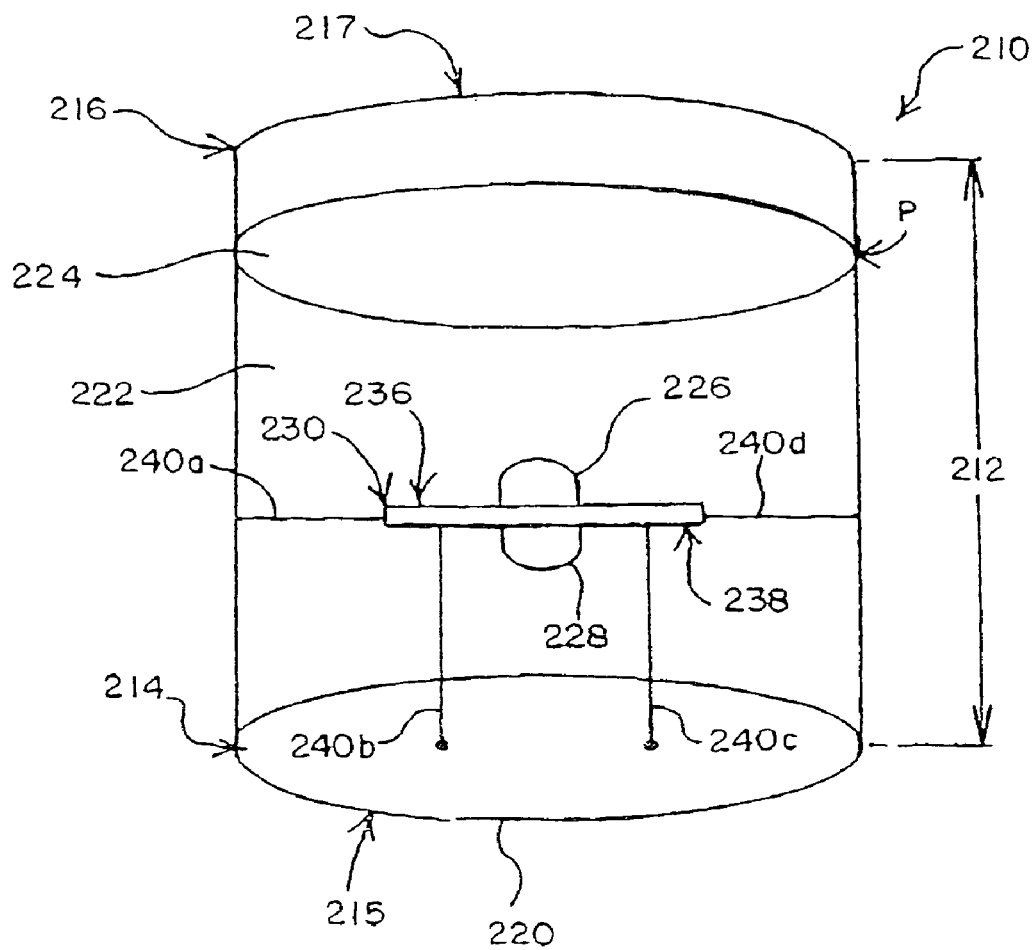
FIG. 3 illustrates a perspective view of a compartment with a movable element, a light source and a light sensor in an embodiment of the present invention.
Figure 4:
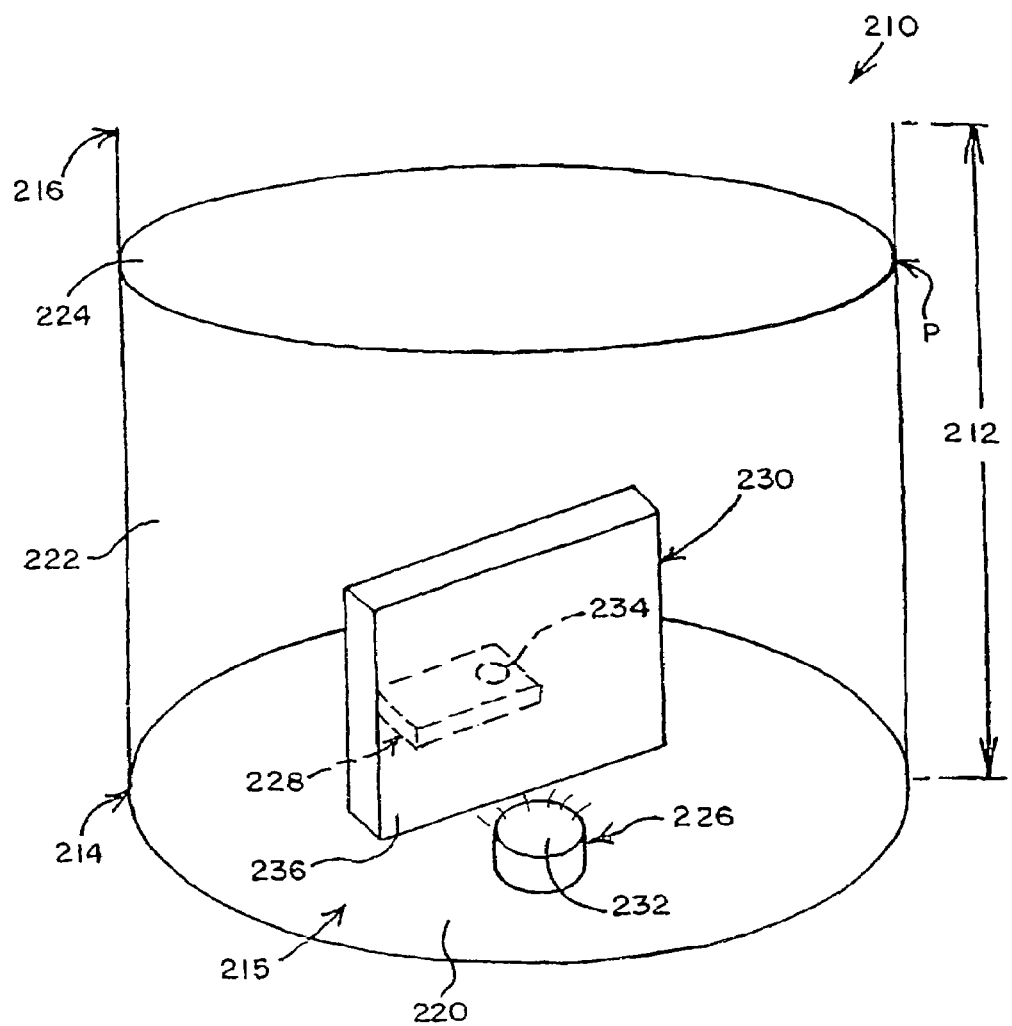
FIG. 4 illustrates a perspective view of a compartment with a movable element, a light source and a light sensor in an embodiment of the present invention.

FIGS. 3 and 4 illustrate a compartment 210 which may have a length 212 defined between a first end 214 and a second end 216. The second end 216 is opposite to the first end 214. The first end 214 and/or the second end 216 may have a first wall 215 and/or a second wall 217, respectively. The compartment 210 may have an interior surface 220 which may define an interior 222. The first wall 215 and/or the second wall 217 may be perpendicular to the interior surface 220 and/or may substantially enclose the compartment 210. The compartment 210 may be a type of cylinder, such as, for example, a hydraulic cylinder, a pneumatic cylinder and/or the like. The compartment 10 may be, for example, a hollow tube and/or the like. The present invention should not be deemed as limited to a specific embodiment of the type of the cylinder of the compartment 210.

The compartment 210 may have a movable element 224 which may be position and/or may be located in the interior 222 of the compartment 210. The movable element 224 may move in the interior 222 of the compartment 210 between the first end 214 and the second end 216. The movable element 224 may move to, may be positioned at and/or may be located at a position P in the interior 222 of the compartment 210 between the first end 214 and the second end 216. The movable element 224 may be, for example, a piston, a sphere, a machine element, a tab, a flange, a spring, a magnet, a closed tube and/or the like. The present invention should not be deemed as limited to a specific embodiment of the movable element 224. It should be understood that the movable element 224 may be any movable element as known to one of ordinary skill in the art.

The interior 222 of the compartment 210 may have a light source 226, a light sensor 228 and/or a base 230. The base 230 may be located between the light source 226 and the light sensor 228. The light source 226, the light sensor 228 and/or the base 230 may be positioned on the interior surface 220 on the first end 215 of the compartment 210 and/or within the interior 222 of the compartment 210. The light source 226 may have a light emitting portion 232 directed inwardly with respect to the interior 222 of the compartment 210 as shown in FIG. 4. The light source 226 may project and/or may emit light into the interior 222 of the compartment 210. The light emitting portion 232 of the light source 226 may be, for example, an light emitting diode (hereinafter "LED"), a halogen light, a flourescent light, an incandescent light, a neon light and/or the like. The present invention may not be deemed as limited to a specific embodiment of the light source 226. It should be understood that the light source 226 may be any light source capable of projecting and/or of emitting light into the interior 222 of the compartment 210 as known to one of ordinary skill in the art.

The light sensor 228 may have a detecting portion 234 directed inwardly with respect to the interior 222 of the compartment 210 as shown in FIG. 4. The light sensor 228 may detect, may determine and/or may measure an intensity of the emitted light into the interior 222 of the compartment 210 via the detecting portion 234. Further, the light sensor 228 may detect, may determine and/or may measure a strength of the light emitted into the interior 222 of the compartment 210 via the detecting portion 234. It should be understood that the light sensor 228 may be any light sensor capable of detecting, of determining and/or of measuring the intensity of the emitted light and/or the strength of the emitted light within the interior 222 of the compartment 210 as known to one of ordinary skill in the art.

As illustrated in FIG. 3, the light source 226 may be attached to and/or may be connected to a first side 236 of the base 230. The light sensor 228 may be attached to and/or may be connected to a second side 238 of the base 230. The first side 236 is opposite to the second side 238 of the base 230. The base 230 may be attached and/or connected to the interior surface 220 of the compartment 210. Supports 240a-240d may be attached to the interior surface 220 and/or the base 230. As a result, the light source 226, the light sensor 228 and/or the base 230 may be attached to and/or may be connected to the interior surface 220 of the compartment 210. Further, the light source 226, the light sensor 228 and/or the base 230 may be located within the interior 222 of the compartment 210 via the supports 240a-240d. The supports 240a-240d may be, for example, a bar, a rod, a wire, a cable, a shaft, a pole and/or the like. The present invention may not be deemed as limited to a specific embodiment of the supports 240a-240d. It should be understood that the supports 240a-240d may have any support capable of attaching and/or connecting the base 230 to the interior surface 220 as known to one of ordinary skill in the art.

As illustrated in FIG. 4, the light source 226, the light sensor 228 and/or the base 230 may be attached to the first wall 215. The base 230 may be located between the light source 226 and the light sensor 228. The light source 226 may be adjacent to first side 236 of the base 230. The light sensor 228 may be adjacent to the second side 238 of the base 230. As illustrated in FIGS. 3 and 4, the base 230 may be interposed between the light source 226 and the light sensor 228. The base 230 may prevent light emitted from the light source 226 from being directed towards the light sensor 228. As a result, the light sensor 228 may detect an intensity of light within the interior 222 of the compartment 210. Further, the base 230 may prevent the light emitting portion 232 from being directed towards the light sensor 228.

The compartment 210, the interior surface 220 of the compartment 210, the base 230, the supports 240a-240d and/or the movable element 224 may be made from a material which may absorb an amount of the light emitted from the light source 226 and/or may have light absorbing properties. The present invention should not be deemed as limited to a specific material of the compartment 210, the interior surface 220 of the compartment 210, the base 230, the supports 240a-240d and/or the movable element 224. It should be understood that the material may be any material and/or any compound which may have light absorbing properties as known to one of ordinary skill in the art.

As the movable element 224 may transpose and/or may move through the compartment 210, a portion of the light emitted from the light source 226 may be absorbed by the movable element 224, the base 230, the supports 240a-240d and/or the interior surface 220 of the compartment 210 between the movable element 224 and the first end 215 of the compartment 210. The portion of the emitted light which may be absorbed by the interior surface 220, the base 230, the supports 240a-240d and/or the movable element 226 may be based on the light absorbing properties of the material of the compartment 210, the base 230, the support 240a-240d and/or the movable element 224. The light sensor 228 may detect, may determine and/or may measure an intensity of the emitted light within the interior 222 of the compartment 210 which may not be absorbed by the movable element 224, the base 230, the supports 240a-240d and/or the interior surface 220 between the movable element 224 and the first end 215 of the compartment 210. The intensity of the emitted light in the interior 222 of the compartment 210 may not include the portion of light which may be absorbed by the movable element 224, the base 230, the supports 240a-240d and/or the interior surface 220 between the movable element 224 and the first end 215 of the compartment 210.

Figure 6:
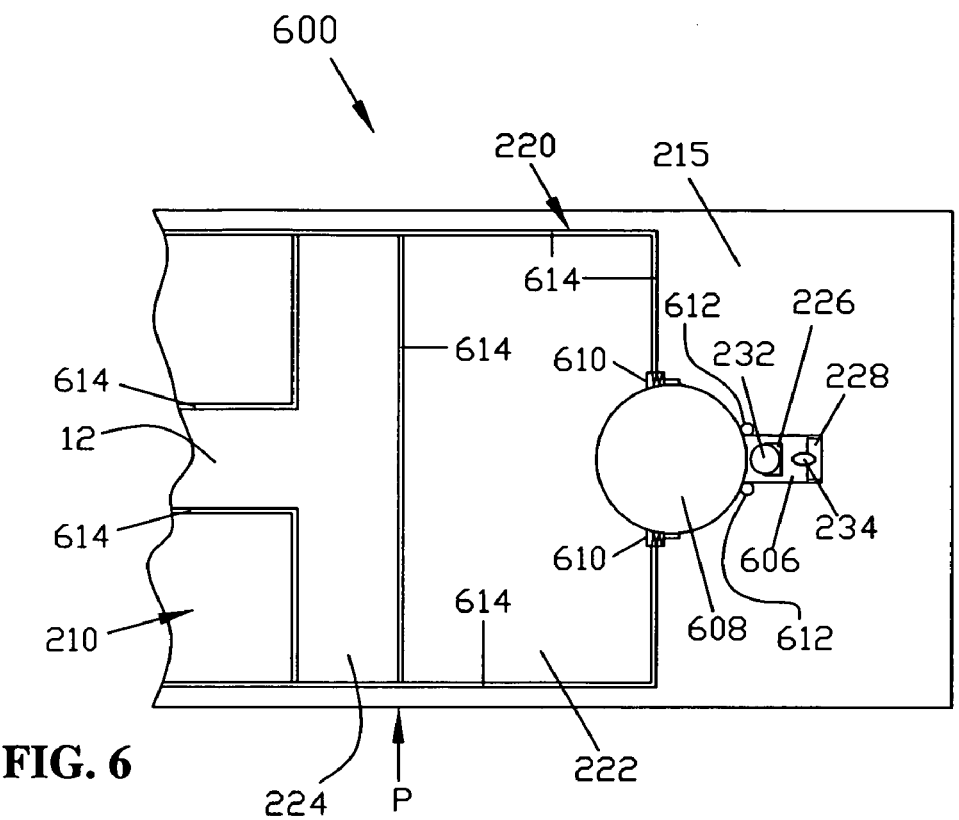
FIG. 6 illustrates a cross-sectional view of an interior of a compartment in an embodiment of the present invention.
Figure 7:
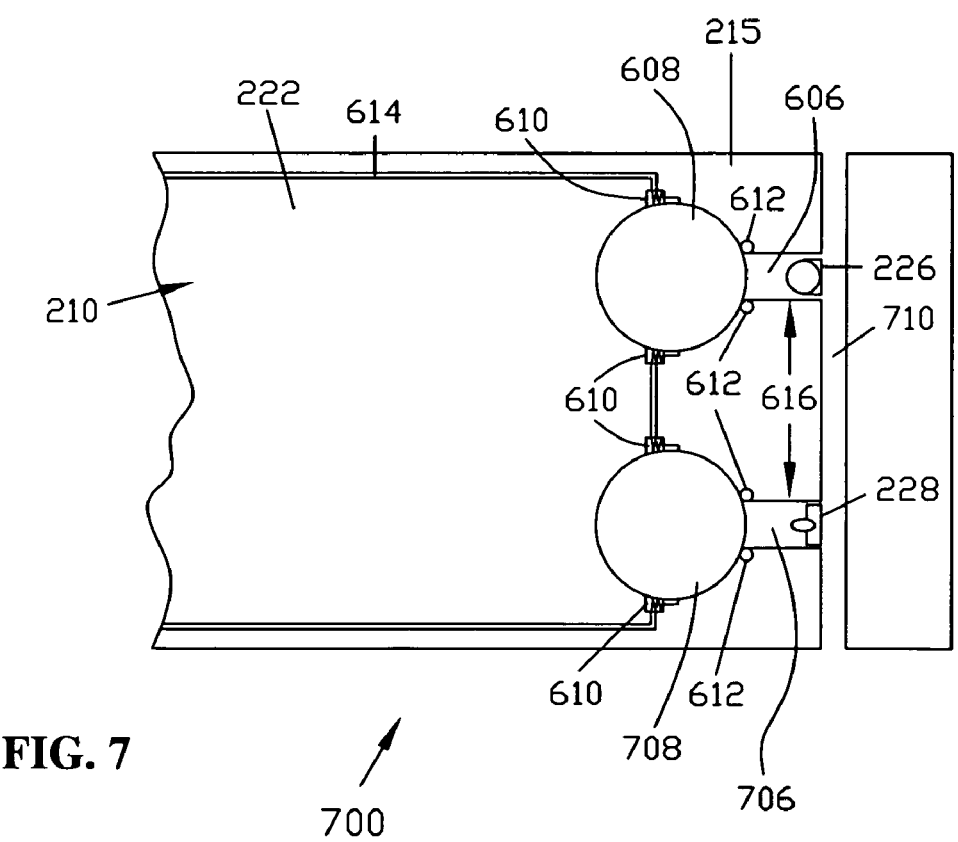
FIG. 7 illustrates a cross-sectional view of an interior of a compartment in an embodiment of the present invention.

In an embodiment, FIG. 6 illustrates a system 600 for measuring and/or for detecting an intensity of the emitted light within the compartment 210 which may correspond to and/or may be based on the position P of the movable element 224 within the interior 222 of the compartment 210. The system 600 may have the movable element 224 which may be positioned at and/or may be located within the interior 222 of the compartment 210. The movable element 224 may move within the interior 222 of the compartment 210 in a first direction 602 and/or in a second direction 604 via the shaft 12. The movable element 224 may move to, may be positioned at and/or may be located at the position P in the interior 222 of the compartment 210 with respect to the first wall 215 of the compartment 210. The first wall 215 of the compartment 210 may have a cavity 606 which may be adjacent to the interior 222 of the compartment 210. The cavity 606 may house, may store and/or may contain the light source 226 and/or the light sensor 228 for emitting light and/or for detecting an intensity of the emitted light within the interior 222 of the compartment 210, respectively. The light emitting portion 232 of the light source 226 may be directed towards the interior 222 of the compartment 210 for emitting the light into the interior 222 of the compartment 210, as shown in FIGS. 6 and 7. The light source 226 may project, may transmit and/or may emit the light into the interior 222 of the compartment 210.

In an embodiment, a driver (not shown in the figures) may be connected to and/or may be in communication with the light source 226 to maintain, to stabilize and/or to control the light emitted into the interior 222 of the compartment 210 from the light source 226. As a result, the light emitted by the light source 226 may be, for example, constant, consistent, uniform and/or continuous. The light emitted from the light source 226 may have a color, such as, for example, red, yellow, green, blue or white for illuminating the interior 222 of the compartment 210. The present invention should not be deemed as limited to a specific embodiment of the color of the light emitted from the light source 226.

Figure 9:
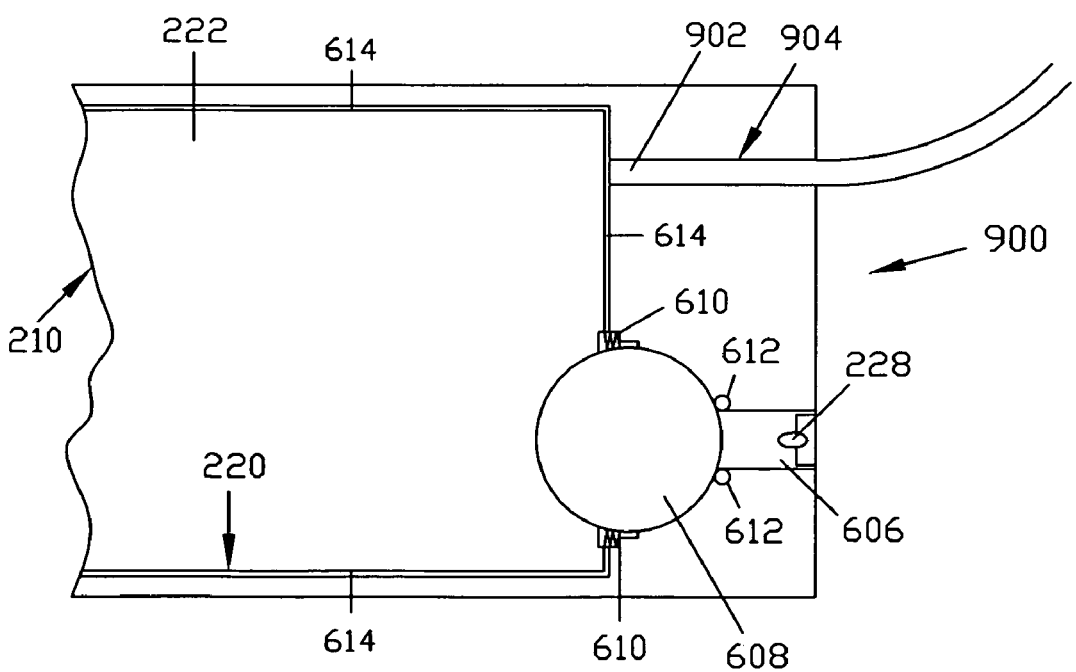
FIG. 9 illustrates a cross-sectional view of an interior of a compartment in an embodiment of the present invention.

The detecting portion 234 of the light sensor 228 which may be located in the cavity 606 may be directed towards the interior 222 of the compartment 210, as shown in FIGS. 6, 7 and 9. The light sensor 228 may detect, may determine and/or may measure an intensity of the emitted light within the interior 222 of the compartment 210 via the detecting portion 234. Further, the light sensor 228 may detect, may determine and/or may measure a strength of the light emitted into the interior 222 of the compartment 210 via the detecting portion 234. The amount of and/or the strength of the emitted light which may be detected and/or may be measured by the light sensor 228 may correspond to the position P of the movable element 224 within the interior 222 of the compartment 210, as shown in FIG. 6.

Figure 8:
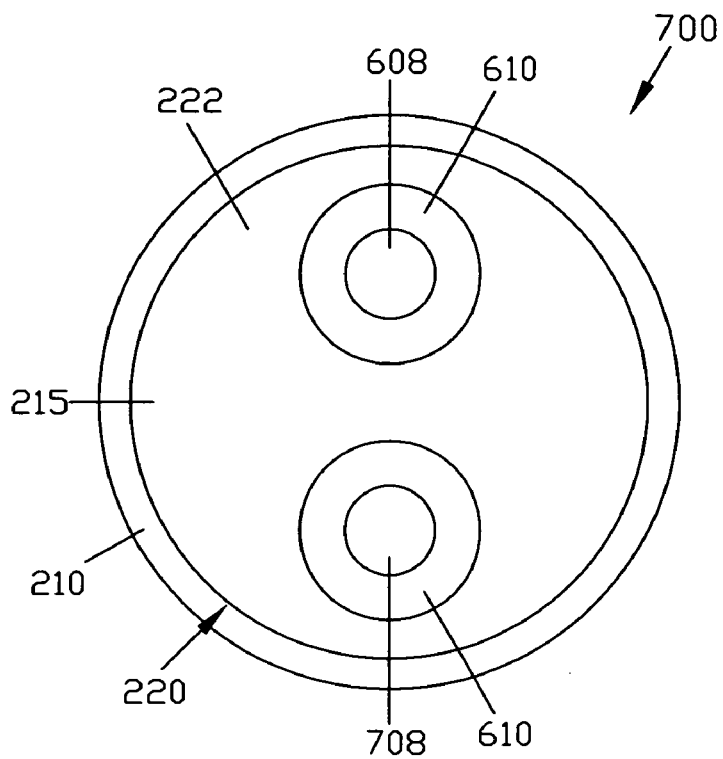
FIG. 8 illustrates a top plan view of an interior of a compartment in an embodiment of the present invention.

A first lens 608 may be inserted into, may be positioned at and/or may be located at the cavity 606 in the first wall 215 of the compartment 210 of the system 600, as shown in FIGS. 6-8. The first lens 608 may protrude into and/or may extend from the cavity 606 into the interior 222 of the compartment 210. The system 700 may have a cavity 706 which may be formed in first wall 215 as shown in FIGS. 7-9. A second lens 708 may be inserted into, may be positioned at and/or may be located in the cavity 706 in the first wall 215 of the compartment 210 of the system 700. The second lens 708 may protrude into and/or may extend from the cavity 706 into the interior 222 of the compartment 210. The first lens 608 and/or the second lens 708 (collectively known hereinafter as "the lenses 608, 708") may connect the light source 226 and/or the light sensor 228 to the interior 222 of the compartment 210. The light source 226 and/or the light detector 228 may transmit and/or may receive the light within the interior 222 of the compartment 210 via the lenses 608, 708.

The lens 608, 708 may be, for example, a spherical ball lens, a fiber coupling sphere, a collimating lens and/or the like. Further, the lens 608, 708 may have a cross-sectional shape of, for example, a circle, an oval and/or the like. The lenses 608, 708 may be made from a material, such as, for example, glass which may have a hardness for preventing damage to the lenses 608, 708 from toxins, high pressures and/or the like. As a result, the lenses 608, 708 may be capable of withstanding high pressures which may be within a range between three thousand pounds per square inch (hereinafter "psi") and five thousand psi.

In an embodiment, the lenses 608, 708 may have a focal distance within the cavity 606 and/or in the cavity 706 (collectively known hereinafter as "the cavities 606, 706"), respectively, which may be based on an index of refraction of the lenses 608, 708. The light source 226 and/or the light sensor 228 may be positioned at and/or may be located at the focal distance of the lenses 608, 708, respectively. The light emitted from the light source 226 may be transmitted into, may be projected into and/or may be emitted into the interior 222 of the compartment 210 via the lenses 608, 708. As a result, the interior 222 of the compartment 210 may be illuminated with the emitted light from the light source 226 via the lenses 608, 708.

The intensity of the emitted light within the interior 222 of the compartment 210 may be transmitted from, may be transferred from and/or may be projected from the interior 222 to the light sensor 228 via the focal distance of the lenses 608, 708. The light sensor 228 may determine, may measure and/or may detect the intensity of the emitted light within the interior 222 of the compartment 210 via the lenses 608, 708. The light sensor 228 may detect and/or may measure the intensity of and/or the strength of the emitted light within the interior 222 of the compartment 210 via the lenses 608, 708. The light sensor 228 may detect and/or may measure ambient light, collimated light and/or non-collimated light which may be emitted into and/or may be illuminating the interior 222 of the compartment 210 from the light source 226 via the lenses 608, 708. As a result, the light sensor 228 may detect and/or may measure the intensity of and/or the strength of the emitted light within the interior 222 of the compartment 210 to determine the position P of the movable element 224.

The lenses 608, 708 may be attached to and/or may be secured to the first wall 215 of the compartment 210 via a retainer 610. The retainer 610 may be inserted, may be located and/or may be positioned between the lenses 608, 708 and the first wall 215 of the compartment 210, as shown FIGS. 6-9. The retainer 610 may abut and/or may contact the lenses 608, 708 and the first wall 215 for securing and/or for attaching the lenses 608, 708 to the compartment 210. The retainer 610 may connect the lenses 608, 708 to the cavities 606, 706, respectively, for sealing and/or for enclosing the interior 222 of the compartment 210. The retainer 610 may be made from a material, such as, for example, steel, brass, iron and/or the like. It should be understood that the material of the retainer 610 may be any material which may attach and/or may secure the lenses 608, 708 to the compartment 210 as known to one of ordinary skill in the art.

The lenses 608, 708 may be attached to and/or may be secured to the cavities 606, 706, respectively, via a seal 612, as shown in FIGS. 6, 7 and 9. The seal 612 may be inserted, may be located and/or may be positioned between the lenses 608, 708 and the cavities 606, 706, respectively. The seal 612 may abut and/or may contact the lenses 608, 708 and the cavities 606, 706, respectively, at the first wall 215 of the compartment 210. The seal 612 may connect the lenses 608, 708 and/or the cavities 606, 706, respectively. The seal 612 may be made from a material, such as, for example, steel, brass, iron, plastic, polyethylene and/or the like. As a result, the interior 222 of the compartment 210 may be sealed and/or may be enclosed via the retainer 610, the lenses 608, 708 and/or the seal 612. The lenses 608, 708 and/or the seal 612 may prevent the gas, the toxin and/or the liquid which may be located within the interior 222 of the compartment 210 from leaking from, from draining from and/or from escaping from the interior 222 of the compartment 210. The present invention should be deemed as limited to a specific embodiment of the material of the seal 612.

A surface 614 may be formed on the compartment 210, the movable element 224 and/or the shaft 12 of the movable element 224. The surface 614 may be adjacent to the interior 222 of the compartment 210 for absorbing an amount of the emitted light within the interior 222 of the compartment 210. The surface 614 may be, for example, a coating, a finish, a texture, a light absorbing substance and/or the like. The surface 614 may be uniform, may be symmetric and/or may be continuous with respect to the interior 222 of the compartment for absorbing the amount of the emitted light from the light source 226. In an embodiment, the surface 614 of the movable element 224 and/or of the compartment 210 may be made from a first light absorbing material and/or a second light absorbing material, respectively.

In an embodiment, the surface 614 may be, for example, a nitrile compound and/or a ceramic compound which may have light absorbing properties and/or light absorbing characteristics. The surface 614 of the compartment 210, the movable head 224 and/or the shaft 12 may have various colors which may affect and/or control the amount of the emitted light which may be absorbed within the interior 222 of the compartment 210. The surface 614 may absorb the amount of the emitted light within the interior 222 of the compartment 210 for determining the position P of the movable element 224 within the interior 222 of the compartment 210. It should by understood that the surface 614 may be any surface which may have light absorbing properties and/or light absorbing characteristics as known to one of ordinary skill in the art.

In an embodiment, the surface 614 of the shaft 12 of the movable element 224 and/or of the compartment 210 may be formed by applying a coarse material (not shown in the figures), such as, for example, a sand paper to the surface 614. The coarse material may roughen, may scratch and/or may damage the shaft 12, the movable element 224 and/or the compartment 210 to form the surface 614 on the shaft 12, the movable element 224 and/or the compartment 210, respectively. As a result, the surface 614 of the shaft 12, the movable element 224 and/or the compartment 210 may have, for example, the light absorbing properties and/or the light absorbing characteristics to absorb the amount of the emitted light within the interior 222 of the compartment 210.

In an embodiment, the cavities 606, 706 may have an interior surface 616 that may be adjacent to the light source 226 and/or to the light sensor 228, respectively, as shown in FIGS. 6, 7 and 9. The interior surface 616 of the cavities 606, 706 may be made from a reflective material, such as, for example, a mirror, plexiglass, glass and/or the like. The interior surface 616 of the cavity 606 may reflect the light emitted from the light source 226 into the interior 222 of the compartment 210 via the lens 608. As a result, the emitted light from the light source 226 may illuminate the interior 222 of the compartment 210 via the lens 608 and/or the interior surface 616 of the cavity 606.

The interior surface 616 of the cavities 606, 706 may reflect the light which may be received from, may be transmitted from and/or may be projected from the interior 222 of the compartment 210 via the lenses 608, 708, respectively, to the light sensor 228. The light sensor 228 may detect and/or may measure the intensity of the emitted light within the interior 222 of the compartment 210 via lenses 608, 708 and/or the interior surface 616 of the cavities 606, 706, respectively. As a result, the light sensor 226 may determine, may identify and/or may locate the position P of the movable element 224 based on the intensity of the emitted light within the interior 222 of the compartment 210.

A passage 710 may be formed in the first wall 215 of the system 700, as shown in FIG. 7. The passage 710 may be adjacent to the cavities 606, 706 for accessing the light source 226 and/or the light sensor 228. The light source 226 and/or the light sensor 228 may be accessed via the passage 710 for removing, for repairing, for replacing and/or for maintaining the light source 226 and/or the light sensor 228 of the system 700. An adapter (not shown in the figures) may be adjacent to the passage 710 for attaching an air source (not shown in the figures), such as, for example, an air compressor, an air conditioner, an air heater and/or the like. The air source may provide conditioned air or unconditioned air to the passage 710 and/or the cavities 606, 706 of the system 700. It should be understood that the air source may be any air source which may provide conditioned air or unconditioned air as known to one of ordinary skill in the art.

FIG. 9 illustrates a system 900 for emitting light into the interior 222 of the compartment 210 and/or for detecting the intensity of the emitted light within the interior 222 of the compartment 210. The system 900 may have an optical fiber 902 connected to the interior 222 of the compartment 210. The optical fiber 902 may extend through the first wall 215 via a channel 904 which may be formed in the first wall 215 of the system 900. The optical fiber 902 may emit, may project and/or may transmit the light into the interior 222 of the compartment 210 for determining and/or for detecting the position P of the movable element 224. The emitted light from the optical fiber 902 may illuminate the interior 222 of the compartment 210 for determining and/or for detecting the position P of the movable element 224.

The surface 614 of the compartment 210, of the movable element 224 and/or of the shaft 14 may absorb the amount of the light which may be emitted into the interior 222 of the compartment 210 from the optical fiber 904. The light sensor 228 may detect and/or may measure the intensity of the emitted light within the interior 222 of the compartment via the lens 708 and/or the interior surface 616 of the cavity 706. The intensity of the emitted light which may be detected by the light sensor 228 may correspond to and/or may be based on the position P of the movable element 224 within the interior 222 of the compartment 210. The light sensor 228 may detect, may determine and/or may identify the position P of the movable element 224 within the interior 222 of the compartment 210 based on the intensity of the emitted light within the interior 222 of the compartment 210.

Figure 5:
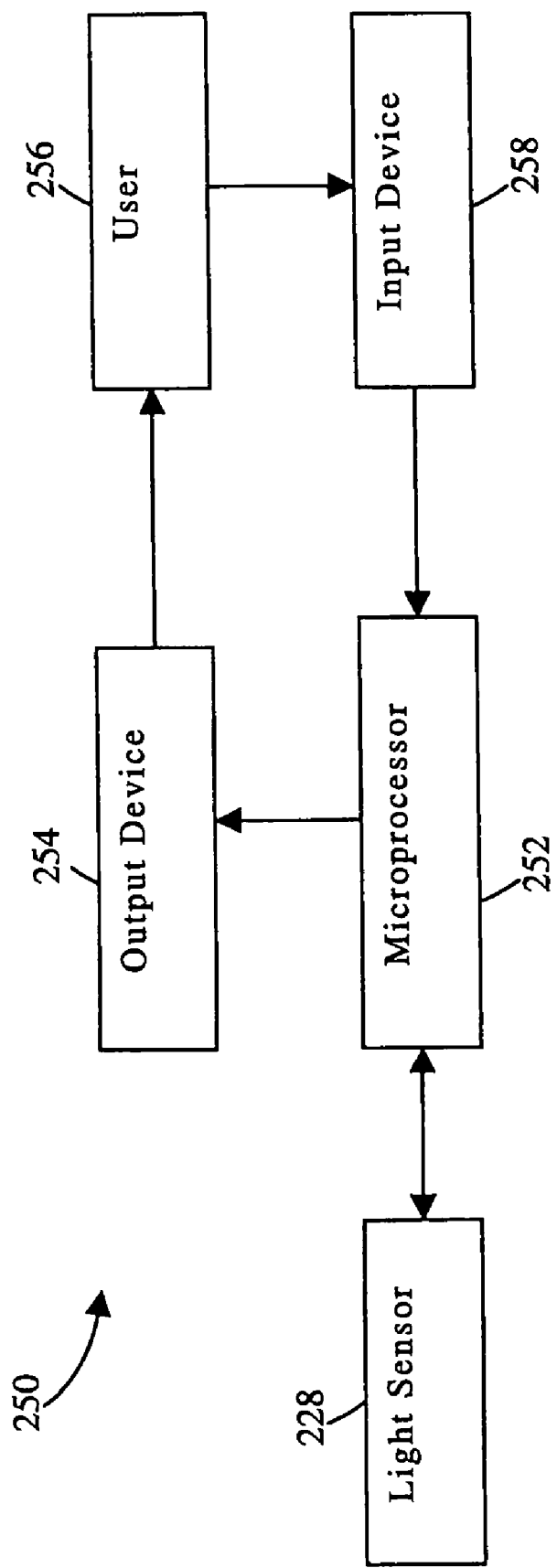
FIG. 5 illustrates a black box diagram of a system in another embodiment of the present invention.

FIG. 5 illustrates, in a black box diagram, an embodiment of a system 250 of the present invention. The light sensor 228 may be connected to and/or may be in communication with a microprocessor 252. The microprocessor 252 may be local with respect to and/or may be remote with respect to the light sensor 228. The light sensor 228 may detect, may measure and/or may determine the intensity of light emitted within the interior 222 of the compartment 210 which may not be absorbed by the movable element 224, the base 230, the supports 240a-240d and/or the interior surface 220 between the movable element 224 and the first end 215 of the compartment 210. The position P of the movable element 224 in the interior 222 of the compartment 210 may correspond to, may relate to and/or may be indicative of the intensity of the emitted light detected by the light sensor 228 within the interior 222. The light sensor 228 may detect, may measure and/or may determine the intensity of the emitted light within the interior 222.

The light sensor 228 may transmit, may send and/or may communicate position information to the microprocessor 252. The position information may relate to, may be based on, may correspond to and/or may be indicative of the intensity of the emitted light detected by the light sensor 228 and/or the position P of the movable element 224. The microprocessor 252 may be programmed to process the position information received from the light source 228. The microprocessor 252 may be programmed to measure, to determine and/or to identify the position P of the movable element 224 in the interior 222 of the compartment 210 based on the position information received from the light sensor 228.

The microprocessor 252 may be connected to and/or may be in communication with an output device 254. The output device 254 may be local with respect to and/or may be remote with respect to the microprocessor 252 and/or the light sensor 228. The output device 254 may be a printer, a monitor, a handheld device, a speaker and/or the like. An output device 254 may display, may indicate and/or may render display information to a user 256. The display information may relate to, may correspond to and/or may be based on the position information, the intensity of light emitted and/or the position P of the movable element 224. The output device 254 may print a graph, a display, a chart and/or the like for illustrating the display information to the user 256. It should be understood that the output device 254 may be any output device capable of communicating the display information to the user 256 known to one of ordinary skill in the art.

The display information may be, for example, logarithmic, linear and/or the like. Further, the display information may be in one or more formats, such as, for example, voltages, currents, pulses, numbers and/or the like. The microprocessor 252 may be programmed to convert, to format and/or to transform the display information between one or more formats. The present invention should not be deemed as limited to a specific embodiment of the one or more formats of the display information. It should be understood that the format of the display information may be any format known to one of ordinary skill in the art.

An input device 258 may be connected to and/or in communication with the microprocessor 252. The input device 258 may be utilized by the user 256 to operate, to control and/or to instruct the microprocessor 252. The input device 258 may be a keyboard, a handheld device, a wireless portable device, a dial, a switch and/or the like. The input device 258 may be remote with respect to the microprocessor 252 and/or the output device 254. The microprocessor 252 may be programmed to receive instructions from the user 256 via the input device 258. The user 256 may select and/or may control the output device 254, the display information and/or the one or more formats of the display information via the input device 258. The present invention should not be deemed as limited to a specific embodiment of the input device 258. It should be understood that the input device 258 may be any input device capable of communicating instructions to the microprocessor 252.

The various embodiments of the present invention may be operated by any power supply known by those skilled in the art. In addition, the various embodiments may be operated in and/or may be operated from remote locations through the use of an electric generator, a pressurized air line, or the like.

The light source 226 and/or the optical fiber 902 may emit and/or may transmit the light into the interior 222 of the compartment 210. The lenses 608, 708 may connect the light source 226 and/or the light sensor 228 to the interior 222 of the compartment 210. The light sensor 228 may measure and/or may detect the intensity of the emitted light from the light source 226 within the interior 222 of the compartment 210 via the lenses 608, 708. The position P of a movable element 224 within the interior 222 of the compartment 210 may correspond to the intensity of the emitted light which may be detected by the light sensor 228. The movable element 224, the shaft 14 to the movable element 224 and/or the compartment 210 may have the surface 614 for absorbing the amount of the emitted light which may be emitted from the light source 226. The gas or the fluid may be stored within the interior 222 of the compartment 210 for moving and/or for driving the movable element 224 within the interior 222 of the compartment 210. The lenses 608, 708 may seal and/or may enclose the interior 222 of the compartment 210 to maintain the gas or the fluid at a pressure in the interior 222 of the compartment 210.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for detecting light, the system comprising:
    a compartment having a body defining an interior wherein the body has an interior surface and a length defined between a first end and a second end of the compartment wherein the interior of the compartment has a pressure;
    a movable element within the interior of the compartment wherein the movable element has a position within the interior of the compartment;
    a wall at the first end of the compartment wherein the wall abuts the body of the compartment;
    a first lens attached to the wall wherein the first lens is located within the interior of the compartment wherein the first lens is spherically shaped and further wherein the first lens encloses the interior and maintains the pressure of the interior;
    a cavity formed in the wall wherein the first lens is located between the cavity and the interior of the compartment;
    a light source located within the cavity wherein the light source emits light into the interior of the compartment wherein the interior surface of the compartment absorbs an amount of the light emitted from the light source; and
    a sensor located within the cavity wherein the sensor detects an intensity of light within the interior of the compartment via the first lens wherein the intensity of the light within the interior of the compartment corresponds to the amount of the light emitted from the light source which is not absorbed by the interior surface of the compartment wherein the position of the movable element within the interior of the compartment corresponds to the intensity of the light within the compartment and further wherein the first lens is located between the sensor and the interior of the compartment.

2. The system of claim 1 further comprising:
    gas within the interior of the compartment wherein the first lens prevents the gas from moving into the cavity.

3. The system of claim 1 further comprising:
    a second lens attached to the wall of the compartment wherein the light source emits the light into the interior of the compartment via the second lens.

4. The system of claim 1 wherein the light source is an optical fiber.

5. The system of claim 1 further comprising:
    fluid within the interior of the compartment wherein the first lens prevents the fluid from moving into the cavity.

6. The system of claim 1 further comprising:
    a passage formed in the wall of the compartment wherein the passage is located between the light source and the sensor.

7. The system of claim 1 further comprising:
    a light absorbing coating on the interior surface of the compartment wherein the light absorbing coating absorbs a portion of the light emitted from the light source.

8. A method for detecting light, the method comprising the steps of:
    providing a compartment having a body defining an interior wherein the body has an interior surface and a length defined between a first end and a second end wherein the compartment has a wall at the first end wherein the wall abuts the body of the compartment wherein the interior of the compartment has a pressure;

positioning a movable element within the interior of the compartment wherein the movable element is located at a first position within the interior with respect to the wall;

forming a cavity in the wall;

connecting a first lens to the wall of the compartment wherein the first lens is located within the interior of the compartment and further wherein the first lens is located between the interior of the compartment and the cavity wherein the first lens is spherically shaped and further wherein the first lens maintains the pressure of the interior of the compartment;

emitting a light into the interior of the compartment wherein the interior surface of the compartment absorbs an amount of the light emitted into the interior of the compartment; and detecting an intensity of light within the interior of the compartment via the first lens wherein the intensity of light corresponds to the amount of emitted light not absorbed by the interior surface of the compartment wherein the amount of emitted light not absorbed by the interior surface of the compartment corresponds to the first position of the movable element.

9. The method of claim 8 further comprising the step of: determining the first position of the movable element based on the intensity of emitted light within the interior.

10. The method of claim 8 wherein the pressure of the interior of the compartment is between three thousand psi and five thousand psi.

11. The method of claim 8 further comprising:
attaching a second lens to the wall of the compartment wherein the light is emitted into the interior of the compartment via the second lens.

12. The method of claim 8 further comprising:
connecting an optical fiber to the wall of the compartment wherein the light is emitted into the interior of the compartment via the optical fiber.

13. The method of claim 8 further comprising the step of: forming a texture on the interior surface of the compartment wherein the texture absorbs the light emitted within the interior of the compartment.

14. The method of claim 8 further comprising the step of: forming a texture on the movable element wherein the texture absorbs an amount of the light emitted within the interior of the compartment.

15. The method of claim 8 further comprising the step of: preventing fluid within the interior of the compartment from moving into the cavity wherein the first lens prevents the fluid from moving into the cavity.

16. A system for detecting light, the system comprising:
a compartment having a body defining an interior wherein the body has an interior surface and a length defined between a first end and a second end of the compartment;
a wall at the first end of the compartment wherein the wall abuts the body of the compartment;
a first lens attached to the wall wherein the first lens is located within the interior of the compartment wherein the first lens is spherically shaped;
a cavity formed in the wall wherein the first lens is located between the cavity and the interior of the compartment;
a light source located within the cavity wherein the light source emits light into the interior of the compartment wherein the interior surface of the compartment absorbs an amount of the light emitted from the light source;
a sensor located within the cavity wherein the sensor detects an intensity of light within the interior of the compartment via the first lens wherein the intensity of the light within the interior of the compartment corresponds to the amount of the light emitted from the light source which is not absorbed by the interior surface of the compartment and further wherein the first lens is located between the sensor and the interior of the compartment; and
a movable element within the interior of the compartment wherein a position of the movable element within the interior of the compartment corresponds to the intensity of the light within the compartment.

17. A system for detecting light, the system comprising:
a compartment having a body defining an interior wherein the body has an interior surface and a length defined between a first end and a second end of the compartment;
a wall at the first end of the compartment wherein the wall abuts the body of the compartment;
a first lens attached to the wall wherein the first lens is located within the interior of the compartment wherein the first lens is spherically shaped;
a cavity formed in the wall wherein the first lens is located between the cavity and the interior of the compartment;
a light source located within the cavity wherein the light source emits light into the interior of the compartment wherein the interior surface of the compartment absorbs an amount of the light emitted from the light source;
a sensor located within the cavity wherein the sensor detects an intensity of light within the interior of the compartment via the first lens wherein the intensity of the light within the interior of the compartment corresponds to the amount of the light emitted from the light source which is not absorbed by the interior surface of the compartment and further wherein the first lens is located between the sensor and the interior of the compartment; and
a light absorbing coating on the interior surface of the compartment wherein the light absorbing coating absorbs the amount of the light emitted from the light source which is not absorbed by the interior surface of the compartment.

18. A method for detecting light, the method comprising the steps of:
providing a compartment having a body defining an interior wherein the body has an interior surface and a length defined between a first end and a second end wherein the compartment has a wall at the first end wherein the wall abuts the body of the compartment;
positioning a movable element within the interior of the compartment wherein the movable element is located at a first position within the interior with respect to the wall;
forming a cavity in the wall;
connecting a first lens to the wall of the compartment wherein the first lens is located within the interior of the compartment and further wherein the first lens is located between the interior of the compartment and the cavity wherein the first lens is spherically shaped;
emitting a light into the interior of the compartment wherein the interior surface of the compartment absorbs an amount of the light emitted into the interior of the compartment;
detecting an intensity of light within the interior of the compartment via the first lens wherein the intensity of light corresponds to the amount of emitted light not absorbed by the interior surface of the compartment; and
determining the first position of the movable element based on the intensity of light within the interior wherein the amount of emitted light not absorbed by the interior surface of the compartment corresponds to the first position of the movable element.

19. A method for detecting light, the method comprising the steps of:

provided a compartment having a body defining an interior wherein the body has an interior surface and a length defined between a first end and a second end wherein the compartment has a wall at the first end wherein the wall abuts the body of the compartment;

positioning a movable element within the interior of the compartment wherein the movable element is located at a first position within the interior with respect to the wall;

forming a cavity in the wall;

connecting a first lens to the wall of the compartment wherein the first lens is located within the interior of the compartment and further wherein the first lens is located between the interior of the compartment and the cavity wherein the first lens is spherically shaped;

emitting a light into the interior of the compartment wherein the interior surface of the compartment absorbs an amount of the light emitted into the interior of the compartment;

forming a texture on the interior surface of the compartment wherein the texture absorbs the light emitted within the interior of the compartment; and detecting an intensity of light within the interior of the compartment via the first lens wherein the intensity of light corresponds to the amount of emitted light not absorbed by the interior surface of the compartment wherein the amount of emitted light not absorbed by the interior surface of the compartment corresponds to the first position of the movable element.

20. A method for detecting light, the method comprising the steps of:

providing a compartment having a body defining an interior wherein the body has an interior surface and a length defined between a first end and a second end wherein the compartment has a wall at the first end wherein the wall abuts the body of the compartment;

positioning a movable element within the interior of the compartment wherein the movable element is located at a first position within the interior with respect to the wall;

forming a cavity in the wall;

connecting a first lens to the wall of the compartment wherein the first lens is located within the interior of the compartment and further wherein the first lens is located between the interior of the compartment and the cavity wherein the first lens is spherically shaped; emitting a light into the interior of the compartment wherein the interior surface of the compartment absorbs an amount of the light emitted into the interior of the compartment;

forming a texture on the movable element wherein the texture absorbs an amount of the light emitted within the interior of the compartment; and detecting an intensity of light within the interior of the compartment via the first lens wherein the intensity of light within the interior corresponds to the amount of emitted light not absorbed by the interior surface of the compartment wherein the amount of emitted light not absorbed by the interior surface of the compartment corresponds to the first position of the movable element.

\* \* \* \* \*